(12) United States Patent
Aknin et al.

(10) Patent No.: US 12,077,234 B2
(45) Date of Patent: Sep. 3, 2024

(54) STEERING AND SUSPENSION MECHANISM

(71) Applicant: REE Automotive Ltd., Kibbutz Glil-Yam (IL)

(72) Inventors: Amit Aknin, Karkom (IL); Shmuel Chioclea, Tel-Aviv (IL)

(73) Assignee: REE Automotive Ltd., Kibbutz Glil-Yam (IL)

( * ) Notice: Subject to any disclaimer, the term of this patent is extended or adjusted under 35 U.S.C. 154(b) by 102 days.

(21) Appl. No.: 17/564,102

(22) Filed: Dec. 28, 2021

(65) Prior Publication Data

US 2022/0204078 A1 Jun. 30, 2022

Related U.S. Application Data

(60) Provisional application No. 63/132,505, filed on Dec. 31, 2020.

(51) Int. Cl.
*B62D 7/16* (2006.01)
*B60G 3/20* (2006.01)
(Continued)

(52) U.S. Cl.
CPC ............... *B62D 7/16* (2013.01); *B60G 3/20* (2013.01); *B62D 7/06* (2013.01); *B62D 7/18* (2013.01);
(Continued)

(58) Field of Classification Search
CPC ... B62D 7/16; B62D 7/06; B62D 7/18; B62D 5/0418; B62D 5/12; B60G 3/20;
(Continued)

(56) References Cited

U.S. PATENT DOCUMENTS 2,555,649 A * 6/1951 Krotz ..................... B62D 7/08
280/124.13
4,519,627 A * 5/1985 Shibahata ............. B62D 7/146
280/5.524
(Continued)

FOREIGN PATENT DOCUMENTS

DE 102010003332 A1 9/2011
DE 102013007967 A1 6/2014
(Continued)

OTHER PUBLICATIONS

International Search Report and Written Opinion isued in International Application No. PCT/IL2021/051556, date of mailing: Mar. 24, 2022, 9pages.

*Primary Examiner* — Timothy Wilhelm
(74) *Attorney, Agent, or Firm* — Brown Rudnick LLP; Matthew P. York

(57) ABSTRACT

A suspension and steering mechanism for a vehicle including at least one suspension arm, a steering arm, and a steering actuator. The suspension arm includes a wheel mounting end and a base end rotatably coupled with a reference frame via a base axis. The steering arm is coupled with the suspension arm at a rotation point of the steering arm. An actuated end of the steering arm extends toward a first direction from the rotation point. The steering actuator includes an actuating end and a fixed end, and is rotatably coupled at the fixed end with the suspension arm and rotatably coupled at the actuating end with the actuated end of the steering arm. A horizontal location of the fixed end is within at least one of a horizontal cross-section of the suspension arm and a triangle defined by the rotation point and the largest width of the base axis.

30 Claims, 6 Drawing Sheets

(51) Int. Cl.
  *B62D 7/06* (2006.01)
  *B62D 7/18* (2006.01)
(52) U.S. Cl.
  CPC .... *B60G 2200/144* (2013.01); *B60G 2200/44* (2013.01); *B60G 2204/14* (2013.01); *B60G 2204/4232* (2013.01)
(58) Field of Classification Search
  CPC .......... B60G 2200/144; B60G 2200/44; B60G 2204/14; B60G 2204/4232; B60G 7/006; B60G 2202/412; B60G 2202/441; B60G 2204/148; B60G 2206/124; B60G 2206/16
  See application file for complete search history.

(56) References Cited

U.S. PATENT DOCUMENTS

| | | | | |
|---|---|---|---|---|
| 5,415,426 A | * | 5/1995 | Strasser | B60G 3/18 280/124.136 |
| 6,267,387 B1 | * | 7/2001 | Weiss | B60G 3/26 280/5.52 |
| 6,293,561 B1 | * | 9/2001 | Goetzen | B62D 17/00 280/86.757 |
| 6,347,802 B1 | * | 2/2002 | Mackle | B62D 17/00 280/5.521 |
| 6,386,553 B2 | * | 5/2002 | Zetterstrom | B60G 3/20 180/413 |
| 7,278,648 B2 | * | 10/2007 | Bobbitt, III | B62D 17/00 280/124.123 |
| 7,537,223 B2 | * | 5/2009 | Zetterstroem | B62D 17/00 280/5.522 |
| 7,606,690 B2 | * | 10/2009 | Nishizawa | G09B 23/08 703/8 |
| 7,866,434 B2 | * | 1/2011 | Shiino | B62D 7/08 280/93.512 |
| 7,878,511 B2 | * | 2/2011 | Haeusler | B60G 7/006 280/124.136 |
| 7,963,361 B2 | * | 6/2011 | Coers | B62D 9/00 180/906 |
| 8,170,792 B2 | * | 5/2012 | Mizuno | B60G 17/016 701/409 |
| 8,474,842 B2 | * | 7/2013 | Shibuya | B60G 3/20 280/93.51 |
| 8,565,973 B2 | * | 10/2013 | Wein | B60G 17/0195 701/69 |
| 9,751,370 B2 | * | 9/2017 | Weifenbach | B62D 17/00 |
| 10,940,730 B2 | * | 3/2021 | Kishida | B60G 3/18 |
| 11,148,493 B2 | | 10/2021 | Riedel | |
| 2003/0111812 A1 | * | 6/2003 | Carlstedt | B62D 17/00 280/124.16 |
| 2004/0135338 A1 | | 7/2004 | Asteggiano | |
| 2005/0017471 A1 | * | 1/2005 | Kim | B62D 9/04 280/86.751 |

FOREIGN PATENT DOCUMENTS

| | | |
|---|---|---|
| DE | 102015203632 A1 | 9/2016 |
| EP | 3050779 A1 | 8/2016 |
| JP | 2010052584 A | 3/2010 |
| WO | 2020145166 A1 | 7/2020 |

\* cited by examiner

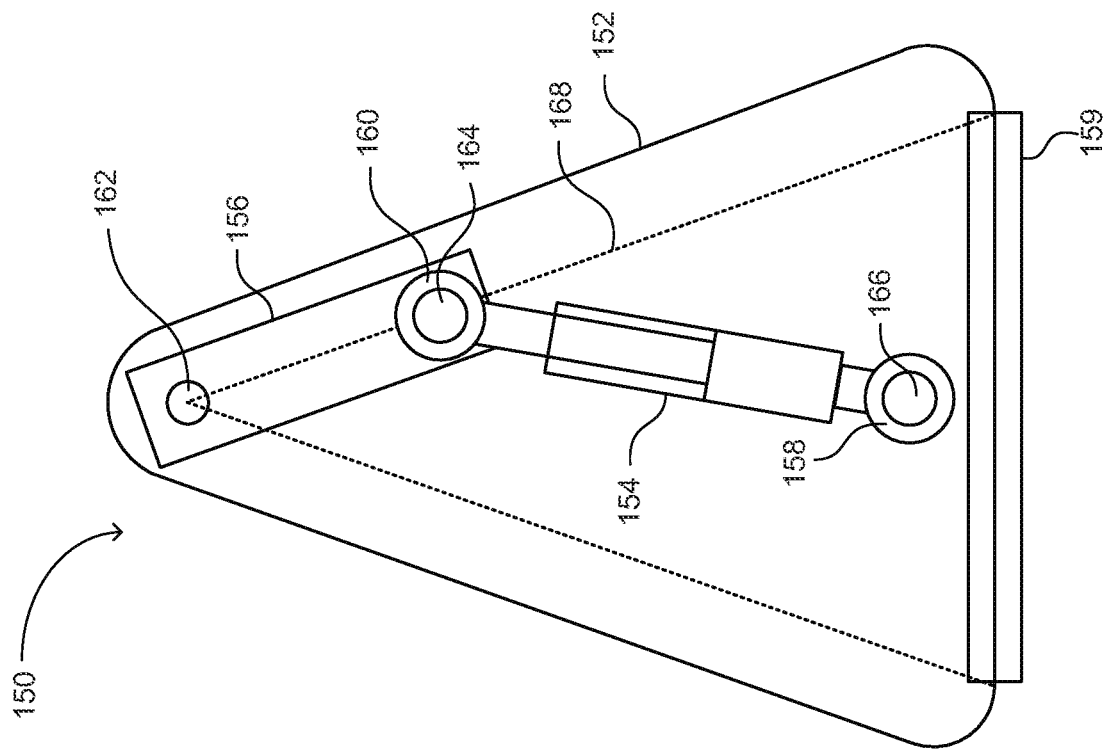
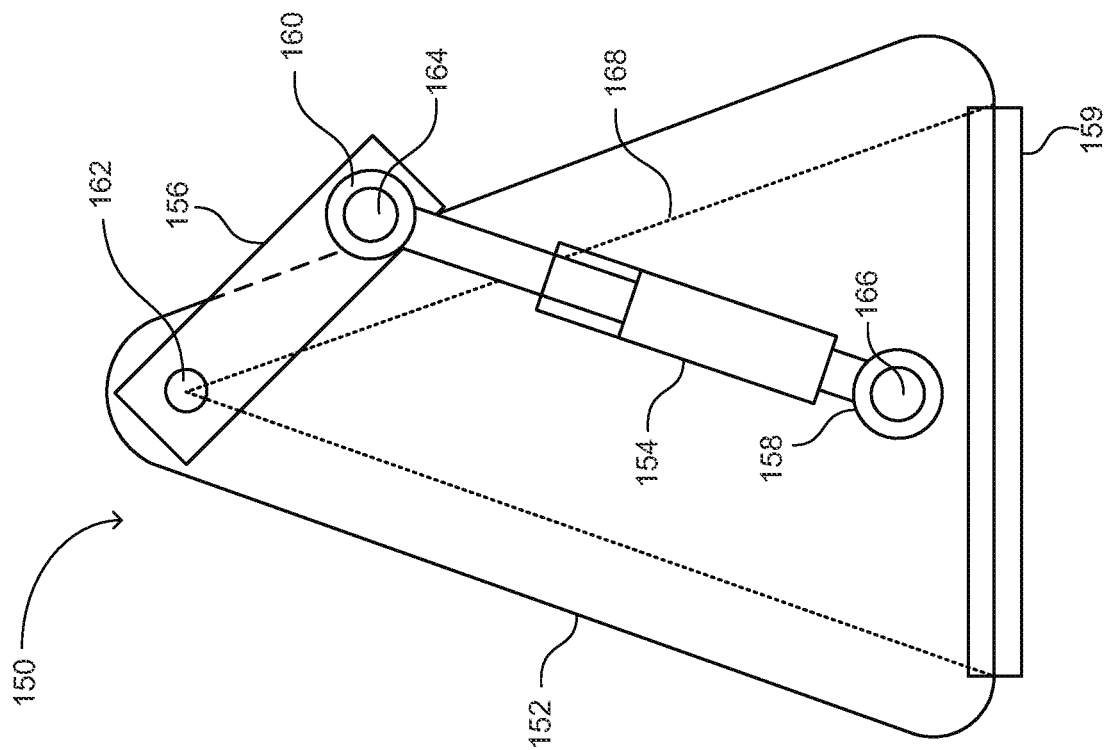

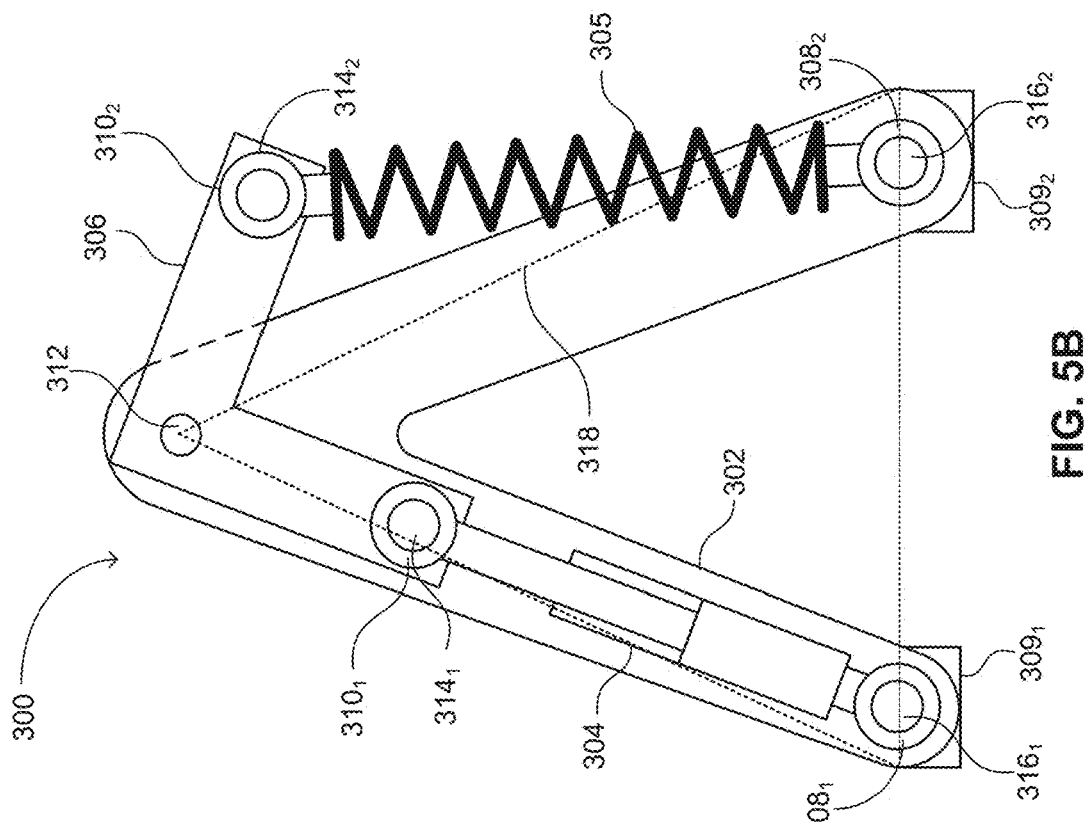
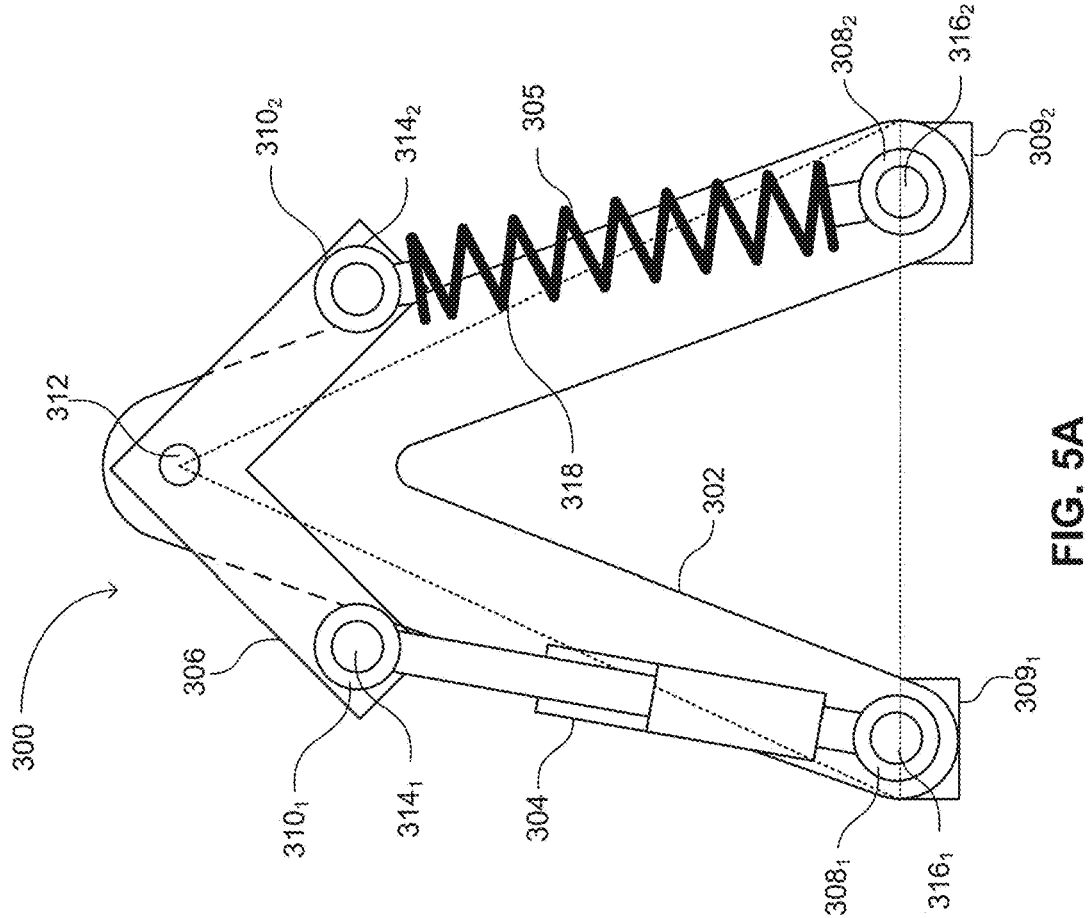

STEERING AND SUSPENSION MECHANISM

CROSS-REFERENCE TO RELATED APPLICATIONS

This application claims priority to, and the benefit of, U.S. Provisional Application No. 63/132,505 filed Dec. 31, 2020, the content of which is incorporated by reference herein in its entirety.

FIELD OF THE INVENTION

The disclosed technique relates to vehicles in general, and to suspension and steering mechanisms in particular.

BACKGROUND

Suspension systems for vehicles are in known the art. In wheeled vehicles, such systems connect a vehicle chassis with a wheel or wheels, but also enable relative motion between the wheel and the chassis at least in the vertical axis of the vehicle. A suspension system aims to maintain contact with the road and to reduce shocks and impacts transferred to the chassis from the wheel. Known in the art suspension systems include springs (e.g., leaf springs, coil springs, torsion bars) and shock absorbers, which are coupled with linkages between the wheel and the chassis of the vehicle.

Transverse suspension systems are widely used in vehicles. Some current transverse suspension systems may provide independent suspension for each of the wheels of the vehicle. One example of a known in the art transverse suspension system is a double wishbone suspension system. The double wishbone suspension system includes two wishbone arms, each pivotally coupled at one end thereof to a reference frame of a vehicle, employing two pivoting connections. The other end of each wishbone arm is coupled with a wheel interface using one pivoting connection. Another example of known in the art transverse suspension system is a MacPherson strut suspension system. The MacPherson strut suspension system includes a single wishbone arm and a telescopic shock absorber which is also used as a steering pivot.

In most wheeled vehicles, steering is required to steer the vehicle in a desired direction. To that end, the wheel or wheels employed for steering rotate about a steering axis, also referred to as a "kingpin axis." In typical steering systems, steering is achieved by an actuator, which pushes and pulls a steering rod which, in turn, rotates the wheel about the kingpin axis.

U.S. Pat. No. 2,555,649 to Krotz, entitled "Vehicle Suspension and Control for Steering Wheels" directs to a combined suspension and steering mechanism wherein a hydraulic actuator is mounted on each of a suspension supporting arm of a wheel employed for steering. Thus, the hydraulic actuators move with the suspension supporting arm and steering is affected by wheel deflection.

SUMMARY

It is an object of the disclosed technique to provide a novel suspension and steering mechanism. In accordance with the disclosed technique, there is thus provided a suspension and steering mechanism for a vehicle which includes at least one suspension arm, a steering arm, and a steering actuator. The suspension arm includes a wheel mounting end and a base end. The base end is rotatably coupled with a reference frame via a base axis. The steering arm includes an actuated end. The steering arm is coupled with the suspension arm at a rotation point of the steering arm. The actuated end extends toward a first direction from the rotation point. The steering actuator includes an actuating end and a fixed end. The steering actuator is rotatably coupled at the fixed end thereof with the suspension arm and rotatably coupled at said actuating end with the actuated end of the steering arm. A horizontal location of the fixed end is within at least one of a horizontal cross-section of the suspension arm and a triangle defined by the rotation point and the largest width of the base axis.

In accordance with another aspect of the disclosed technique, there is thus provided a suspension and steering mechanism which includes at least one suspension arm, a steering arm, and a steering actuator. The suspension arm includes a wheel mounting end and a base end. The base end is rotatably coupled with a reference frame via a base axis. The steering arm includes an actuated end and is coupled with the suspension arm at a rotation point of the steering arm. The steering actuator includes an actuating end and a fixed end. The fixed end is rotatably coupled with the suspension arm. The actuating end is rotatably coupled with the actuated end of the steering arm. The actuating end is configured to move between an extended position and a retracted position. When the actuating end is in the retracted position, a horizontal position of the actuating end is inside a horizontal cross-section of suspension arm.

In accordance with a further aspect of the disclosed technique, there is thus provided a wheel assembly including a sub-frame and a suspension and steering mechanism for a vehicle which includes at least one suspension arm, a steering arm, and a steering actuator. The suspension arm includes a wheel mounting end and a base end. The base end is rotatably coupled with the sub-frame via a base axis. The steering arm includes an actuated end. The steering arm is coupled with the suspension arm at a rotation point of the steering arm. The actuated end extends toward one direction from the rotation point. The steering actuator includes an actuating end and a fixed end. The steering actuator is rotatably coupled at the fixed end thereof with the suspension arm and rotatably coupled at said actuating end with the actuated end of the steering arm. A horizontal location of the fixed end is within at least one of a horizontal cross-section of the suspension arm and a triangle defined by the rotation point and the largest width of the base axis.

In accordance with another aspect of the disclosed technique, there is thus provided a vehicle including a vehicle reference frame and at least one suspension and steering mechanism which includes at least one suspension arm, a steering arm, and a steering actuator. The suspension arm includes a wheel mounting end and a base end. The base end is rotatably coupled with a reference frame via a base axis. The steering arm includes an actuated end. The steering arm is coupled with the suspension arm at a rotation point of the steering arm. The actuated end extends toward one direction from the rotation point. The steering actuator includes an actuating end and a fixed end. The steering actuator is rotatably coupled at the fixed end thereof with the suspension arm and rotatably coupled at said actuating end with the actuated end of the steering arm. A horizontal location of the fixed end is within at least one of a horizontal cross-section of the suspension arm and a triangle defined by the rotation point and the largest width of the base axis. The suspension and steering mechanism is connected with the vehicle reference frame.

In accordance with a further aspect of the disclosed technique, there is thus provided a vehicle, including a vehicle reference frame and at least one suspension and steering mechanism which includes at least one suspension arm, a steering arm, and a steering actuator. The suspension arm includes a wheel mounting end and a base end. The base end is rotatably coupled with a reference frame via a base axis. The steering arm includes an actuated end and is coupled with the suspension arm at a rotation point of the steering arm. The steering actuator includes an actuating end and a fixed end. The fixed end is rotatably coupled with the suspension arm. The actuating end is rotatably coupled with the actuated end of the steering arm. The actuating end is configured to move between an extended position and a retracted position. When the actuating end is in the retracted position, a horizontal position of the actuating end is inside a horizontal cross-section of suspension arm. The suspension and steering mechanism is connected with the vehicle reference frame.

BRIEF DESCRIPTION OF THE DRAWINGS

The disclosed technique will be understood and appreciated more fully from the following detailed description taken in conjunction with the drawings in which:

FIGS. 2A and 2B are schematic illustrations of a top view of a suspension and steering mechanism, constructed and operative in accordance with another embodiment of the disclosed technique;

FIGS. 5A and 5B are schematic illustrations of a suspension and steering mechanism, constructed and operative in accordance with a further embodiment of the disclosed technique.

DETAILED DESCRIPTION

The disclosed technique overcomes the disadvantages of the prior art by providing a steering and suspension mechanism, which includes at least one suspension arm and a steering actuator. The suspension arm includes a wheel mounting end and a base end. The steering actuator includes an actuating end and a fixed end. The fixed end is rotatably coupled with the suspension arm. The horizontal location of the fixed end is within at least one of a horizontal cross section of the suspension arm, and a triangle defined by the rotation point of the steering arm and the largest width of axes or axis about which the suspension arm rotates.

In the explanations which follow, the plane over which a vehicle maneuvers, is referred to herein as a "horizontal plane" and an axis perpendicular to such a horizontal plane, is referred to herein as a "vertical axis". When the vehicle is a wheeled vehicle, the "horizontal plane" may be the plane (e.g., terrain) over which a wheel rolls. The terms "vertical motion" and "motion in the vertical direction", relate herein to motion along a vertical axis as per the definition thereof above. Also, the term "in-motion axis" relates to an axis pointing in a direction along which the wheel rolls (i.e., the in-motion direction, e.g. longitudinal direction of the vehicle). Typically, the in-motion axis is parallel (or substantially parallel, for example, when wheel has a camber angle) to the horizontal plane. The term "lateral axis" relates to an axis perpendicular (or substantially perpendicular) to both the vertical axis and the in-motion axis, pointing in a direction perpendicular to the direction toward which the wheel rolls (i.e., lateral direction). Also, the terms "coupled at pivot point", "pivotally coupled", "coupled at rotation point" and "rotatably coupled" are all employed herein interchangeably and relate to two elements coupled such that these two elements may rotate one with respect to the other.

Figure 1B:
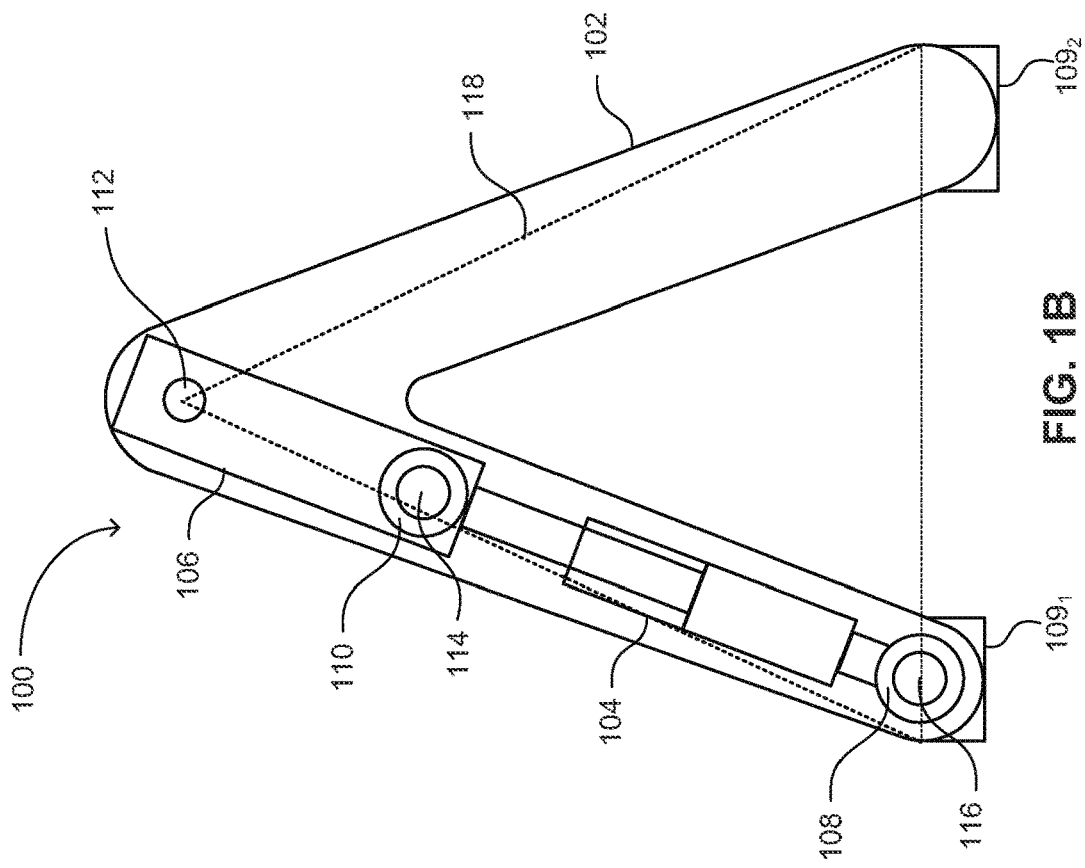
FIGS. 1A and 1B are schematic illustrations of a top view of a suspension and steering mechanism constructed and operative in accordance with an embodiment of the disclosed technique.
Figure 1A:
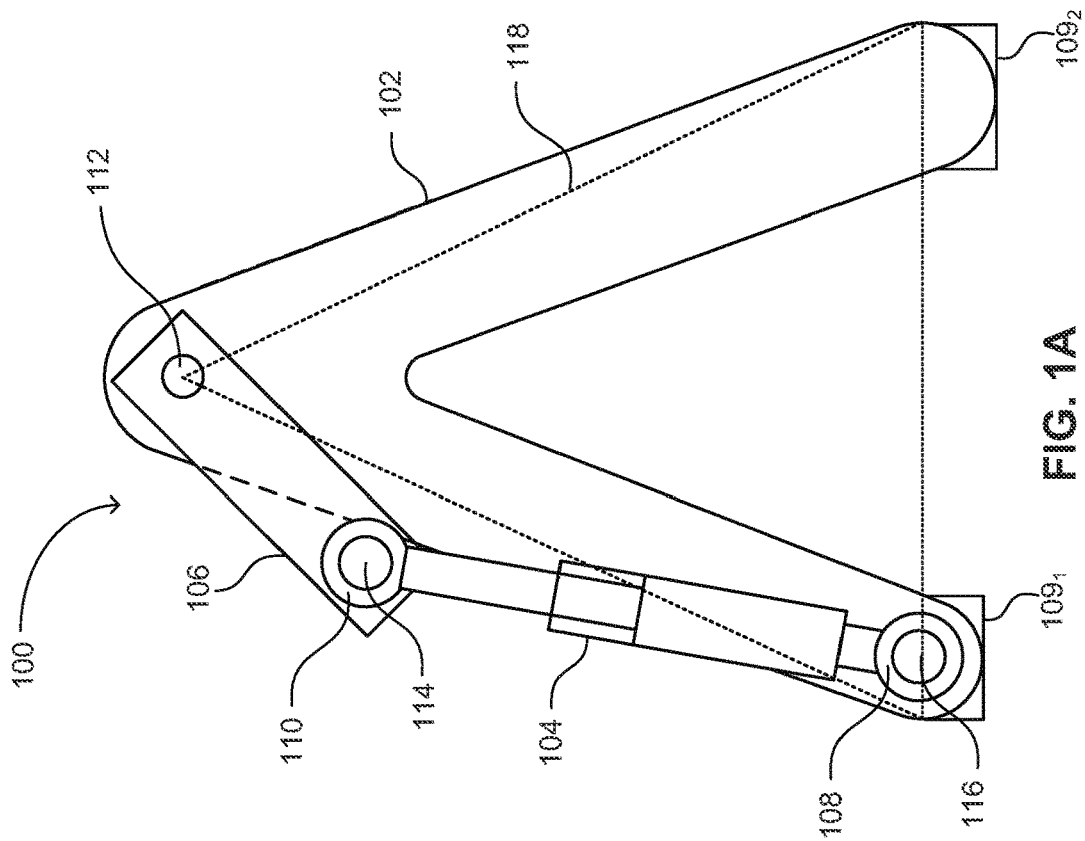

Reference is now made to FIGS. 1A and 1B, which are schematic illustrations of a top view of a suspension and steering mechanism, generally referenced 100, constructed and operative in accordance with an embodiment of the disclosed technique. Suspension and steering mechanism 100 includes at least one suspension arm 102, a steering actuator 104, and a steering arm 106. Suspension arm 102 includes a wheel mounting end and a base end. The wheel mounting end of suspension arm 102 includes a steering axis 112. Steering axis 112 may be along the wheel kingpin axis. Steering actuator 104 includes an actuating end 110 and a fixed end 108. Steering actuator 104 is, for example, a linear actuator (e.g., a hydraulic actuator, an electric linear actuator or a pneumatic linear actuator).

A rotation point of steering arm 106 is coupled with suspension arm 102 at steering axis 112 such that steering arm 106 and suspension arm 102 rotate one with respect to the other about steering axis 112. As further exemplified in FIGS. 1A and 1B, this rotation point of steering arm 106 is coupled with a suspended wheel mount to which a wheel is coupled, such that when steering arm 106 rotates about kingpin axis 112, the suspended wheel mount also rotates therewith. The rotation point of steering arm 106 is connected with suspension arm 102 at steering axis 112, for example, by a constant velocity (CV) joint, thus transferring moment while allowing flexibility of movement between steering arm 106 and suspension arm 102. An actuated end of steering arm 106 is coupled with actuating end 110 of steering actuator 104 at axis 114, such that steering actuator 104 and steering arm 106 can rotate one with respect to the other about axis 114. Fixed end 108 of actuator arm 104 is rotatably coupled with suspension arm 102 at vertical axis 116 such that steering actuator 104 and suspension arm 102 can rotate one with respect to the other about vertical axis 116. The base end of suspension arm 102 is rotatably coupled with a reference frame via a joint 1091 and a joint 1092. Each of joints 1091 and 1092 rotates around a base axis (not shown) extending through joints 1091 and 1092 such that suspension arm 102 rotates about joints 1091 and 1092 (i.e., in and out of the page of FIGS. 1A and 1B). In some embodiments, the reference frame is part of a vehicle platform (e.g., vehicle structural frame or a chassis) and as such can be referred to as a vehicle reference frame. In some alternative embodiments, the reference frame is a sub-frame, adapted for coupling to a vehicle platform (e.g., to a vehicle structural frame or a chassis).

In the example brought forth in FIGS. 1A and 1B, as actuating end 110 of steering actuator 104 extends, steering arm 106 and thus the suspended wheel mount rotates clockwise about steering axis 112. As actuating end 110 of steering actuator 104 retracts, steering arm 106 and thus the suspended wheel mount rotates counterclockwise about steering axis 112. Also actuating end 110 is configured to move between a retracted position and an extended position. As seen in FIGS. 1A and 1B, as actuating end 110 extends, the horizontal position actuating end 110 move outside the horizontal cross-section of suspension arm 102. Conversely, as actuating end 110 retracts, the horizontal position actuating end 110 move inside the horizontal cross-section of suspension arm 102. Further as depicted in FIGS. 1A and 1B, the horizontal position of fixed end 108 is located within at least one of a horizontal cross-section of suspension arm 102 and a triangle 118 defined by the rotation point of steering arm 106 (and steering axis 112) and the largest width between joint 1091 and joint 1092. Along the base axis, the largest width is defined as the width between the farthest points separating joints 1091 and 1092 which is the base of triangle 118 as shown in FIGS. 1A and 1B.

Reference is now made to FIGS. 2A and 2B, which are schematic illustrations of a top view of a suspension and steering mechanism, generally referenced 150, constructed and operative in accordance with another embodiment of the disclosed technique. Suspension and steering mechanism 150 includes at least one suspension arm 152, a steering actuator 154, and a steering arm 156. Suspension arm 152 includes a wheel mounting end and a base end. The wheel mounting end of suspension arm 152 includes a steering axis 162. Steering actuator 154 includes an actuating end 160 and a fixed end 158. Steering actuator 154 is, for example, a linear actuator (e.g., a hydraulic actuator, an electric linear actuator, or a pneumatic linear actuator).

A rotation point of steering arm 156 is coupled with suspension arm 152 at steering axis 162 such that steering arm 156 and suspension arm 152 rotate one with respect to the other about steering axis 162. Similar to as described above in conjunction with FIGS. 1A and 1B, and as further exemplified in FIGS. 4A and 4B, this rotation point of steering arm 156 is coupled with a suspended wheel mount to which a wheel is coupled, such that when steering arm 156 rotates about steering axis 162, the suspended wheel mount also rotates therewith. The rotation point of steering arm 156 is connected with suspension arm 152 at steering axis 162, for example, by a CV joint. A CV joint may further connect the rotation point of steering arm 156 and the suspended wheel mount, thus transferring moment while allowing flexibility of movement between steering arm 156 the suspended wheel mount. A second end (i.e., an actuated end) of steering arm 156 is coupled with actuating 160 end of steering actuator 154 at axis 164, such that steering actuator 154 and steering arm 156 can rotate one with respect to the other about axis 164. Fixed end 158 of actuator arm 154 is rotatably coupled with suspension arm 152 at vertical axis 166 such that steering actuator 154 and suspension arm 152 can rotate one with respect to the other about axis 166. The base end of suspension arm 152 is rotatably coupled with a reference frame via horizontal axis 159 such that suspension arm 152 rotates about horizontal axis 159.

Actuating end 160 is configured to move from a retracted position to an extended position. As actuating end 160 of steering actuator 154 extends, steering arm 156, and thus the suspended wheel mount rotates counterclockwise about steering axis 162. As actuating end 160 of steering actuator 154 retracts, steering arm 156, and thus the suspended wheel mount rotates clockwise about steering axis 162. Also, similar to as described above in conjunction with FIGS. 1A and 1B, as seen in FIGS. 2A and 2B, as actuating end 160 extends, the horizontal position of actuating end 160 moves toward a position located outside the horizontal cross-section of suspension arm 152. Conversely, as actuating end 160 retracts, the horizontal position actuating end 160 is located inside the horizontal cross-section of suspension arm 152. Further as depicted in FIGS. 2A and 2B, and similar to as described above in conjunction with FIGS. 1A and 1B, the horizontal position of fixed end 158 is located within at least one of a horizontal cross-section of suspension arm 152, and a triangle 168 defined by the rotation point of steering arm 156 (steering axis 162) and the largest width of axis 159.

Figures 3A, 3B:
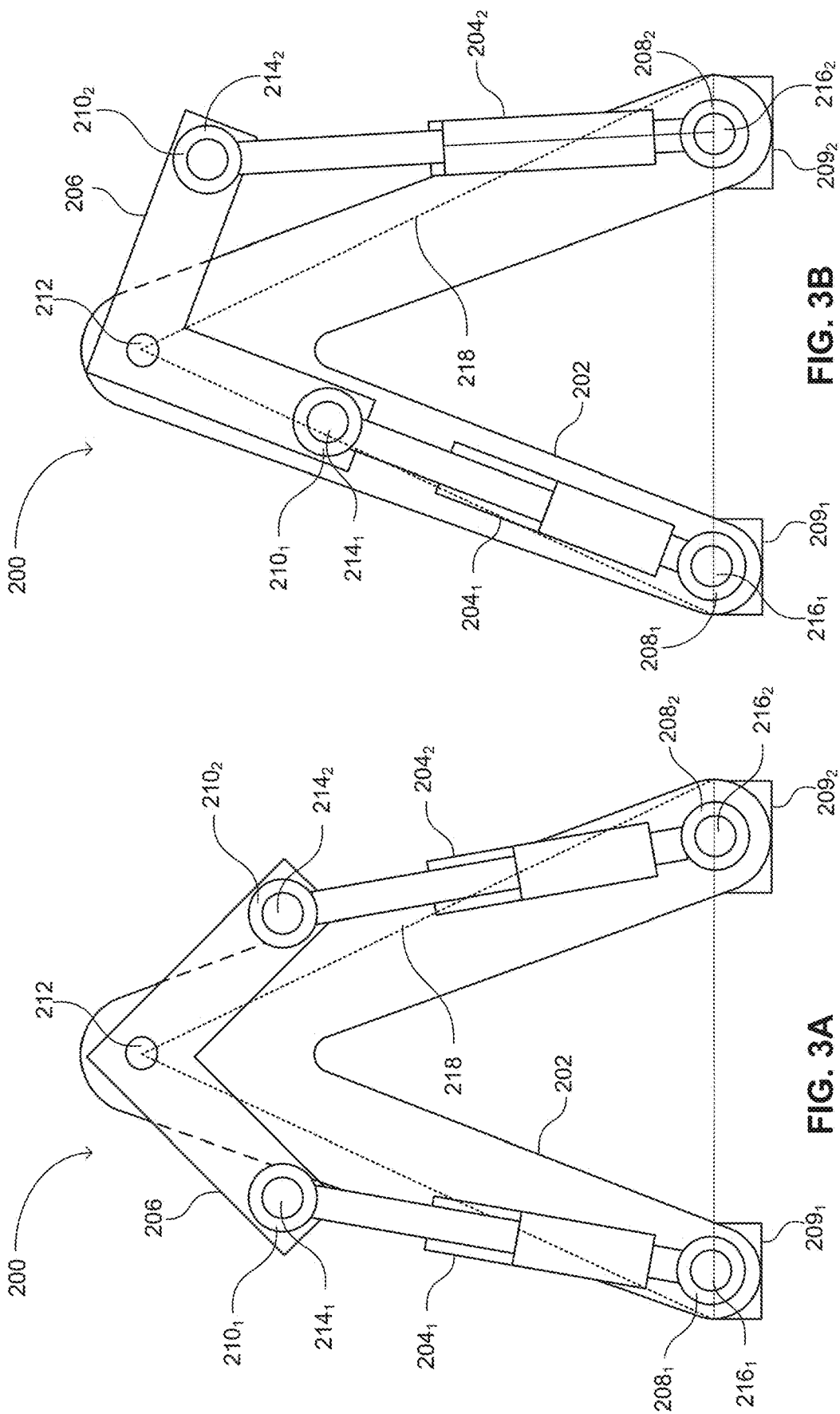
FIGS. 3A and 3B are schematic illustrations of a top view of a suspension and steering mechanism, constructed and operative in accordance with a further embodiment of the disclosed technique.

A steering and suspension mechanism according to the disclosed technique may include two steering actuators. Reference is now made to FIGS. 3A and 3B, which are schematic illustrations of a suspension and steering mechanism, generally referenced 200, constructed and operative in accordance with a further embodiment of the disclosed technique. Suspension and steering mechanism 200 includes at least one suspension arm 202, two steering actuators, first steering actuator 2041 and second steering actuator 2042, and a steering arm 206. Suspension arm 202 includes a wheel mounting end and a base end. The wheel mounting end of suspension arm 202 includes a steering axis 212. Steering arm 206 is a double steering arm (e.g., L shaped double steering arm, V shaped double steering arm, arcuated double steering arm, a straight double steering arm) and includes two arms extending from a rotation point, where each arm includes an actuated end. The arms are not necessarily symmetric. First steering actuator 2041 includes an actuating end 2101 and a fixed end 2081. First steering actuator 2041 is, for example, a linear actuator (e.g., a hydraulic actuator, an electric linear actuator or a pneumatic linear actuator). Similarly, second steering actuator 2042 includes an actuating end 2102 and a fixed end 2082. Second steering actuator 2042 is also, for example, a linear actuator.

The steering arm 206 is coupled with suspension arm 202 at steering axis 212 and at the rotation point of steering arm 206, such that steering arm 206 and suspension arm 202 rotate one with respect to the other about steering axis 212, and each of the actuated ends extend toward opposite sides of the rotation point. Similar to as described above, a suspended wheel mount (i.e., to which a wheel is coupled) is coupled with steering arm 206 at or near this rotation point such that when steering arm 206 rotates about steering axis 212, the suspended wheel mount also rotates therewith. The rotation point of steering arm 206 is connected with suspension arm 202, for example, by a CV joint. A CV joint may further connect the rotation point of steering arm 206 and the suspended wheel mount. A CV joint transfers moment while allowing flexibility of movement between steering arm 206 and the suspended wheel mount. A first actuated end of steering arm 206 is coupled with actuating end 2101 of first steering actuator 2041 at axis 2141, such that first steering actuator 2041 and steering arm 106 can rotate one with respect to the other about axis 2141. Fixed end 2081 of first steering actuator 2041 is rotatably coupled with suspension arm 202 at vertical axis 2161 such that first steering actuator 2041 and suspension arm 202 can rotate one with respect to the other about vertical axis 2161.

Similarly, a second actuated end of steering arm 206 is coupled with actuating end 2102 of second steering actuator 2042 at axis 2142, such that second steering actuator 2042 and steering arm 206 can rotate one with respect to the other about axis 2142. Fixed end 2082 of second actuator arm 2042 is rotatably coupled with suspension arm 202 at vertical axis 2162 such that second steering actuator 2042 and suspension arm 202 can rotate one with respect to the other about vertical axis 2162. The base end of suspension arm 202 is rotatably coupled with a reference frame via a joint 2091 and a joint 2092. Each of joints 2091 and 2092 rotates around a base axis (not shown) extending through joints 2091 and 2092 such that suspension arm 202 rotates about joints 2091 and 2092 (i.e., in and out of the page of FIGS. 3A and 3B).

In the example brought forth in FIGS. 3A and 3B, actuating ends 2101 and 2102 are configured to move from a retracted position to an extended position. As actuating end 2101 of first steering actuator 2041 retracts, and actuating end 2102 of second steering actuator 2042 extends, steering arm 206 and thus the suspended wheel mount rotate counterclockwise. As actuating end 2101 of first steering actuator 2041 extends, and actuating end 2102 of second steering actuator 2042 retracts, steering arm 206 and thus the suspended wheel mount rotate clockwise. Also, as seen in FIGS. 3A and 3B, as actuating ends 2101 extends, the horizontal position actuating end 2101 move outside the horizontal cross-section of suspension arm 202. Conversely, as actuating end 2101 retracts, the horizontal position actuating end 2101 moves inside the horizontal cross-section of suspension arm 202. Similarly, as actuating ends 2102 extends, the horizontal position actuating end 2102 moves outside the horizontal cross-section of suspension arm 202. Conversely, as actuating end 2102 retracts, the horizontal position actuating end 2102 moves inside the horizontal cross-section of suspension arm 202. Further as depicted in FIGS. 3A and 3B, and similar to as described above in conjunction with FIGS. 1A and 1B and FIGS. 2A and 2B, the horizontal position of one of the fixed ends 2081 and 2082 is located within at least one of a horizontal cross-section of suspension arm 202 and a triangle 218 defined by the rotation point of steering arm 206 (i.e., and steering axis 212) and the largest width between joint 2091 and joint 2092. Along the base axis, the largest width is defined as the width between the farthest points separating joints 2091 and 2092 which is the base of triangle 218 as shown in FIGS. 3A and 3B. In general, when two or more steering actuators are employed, the horizontal position of a fixed end of at least of the steering actuators is located within at least one of a horizontal cross-section of the suspension arm and a triangle defined by the rotation point of the steering arm and the largest width between axis or axes about which the suspension arm rotates. According to another embodiment, for example as shown in FIGS. 1A to 3B, and FIGS. 5A and 5B below, the horizontal position of a fixed end of a steering actuator is located within a geometry (e.g., a triangle, a square, a rectangle, polygon) defined by the steering axis and the axis or axes about which the suspension arm rotates.

Figure 4A:
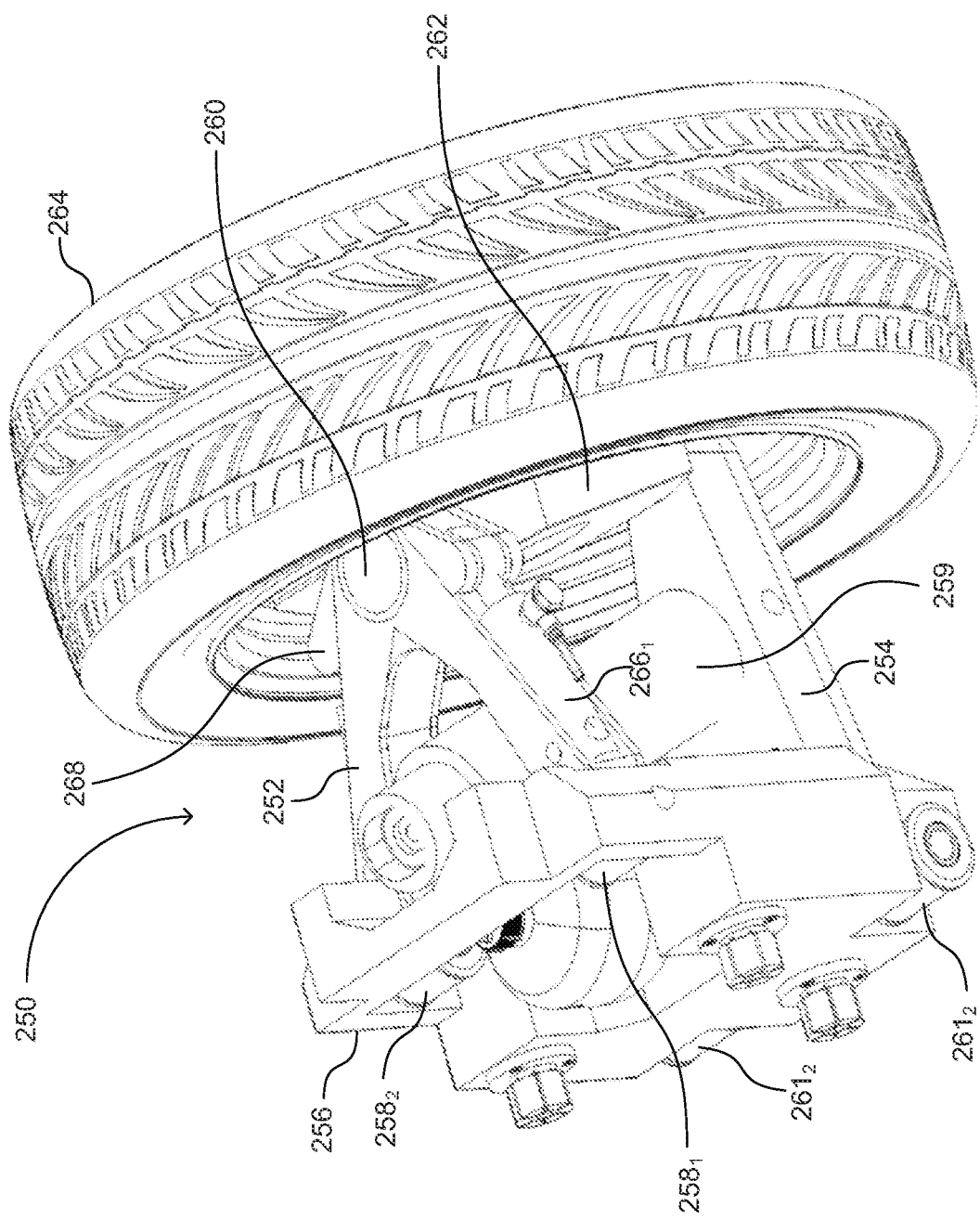
FIGS. 4A and 4B are schematic illustrations of an exemplary implementation of a suspension and steering mechanism, constructed and operative in accordance with another embodiment of the disclosed technique.
Figure 4B:
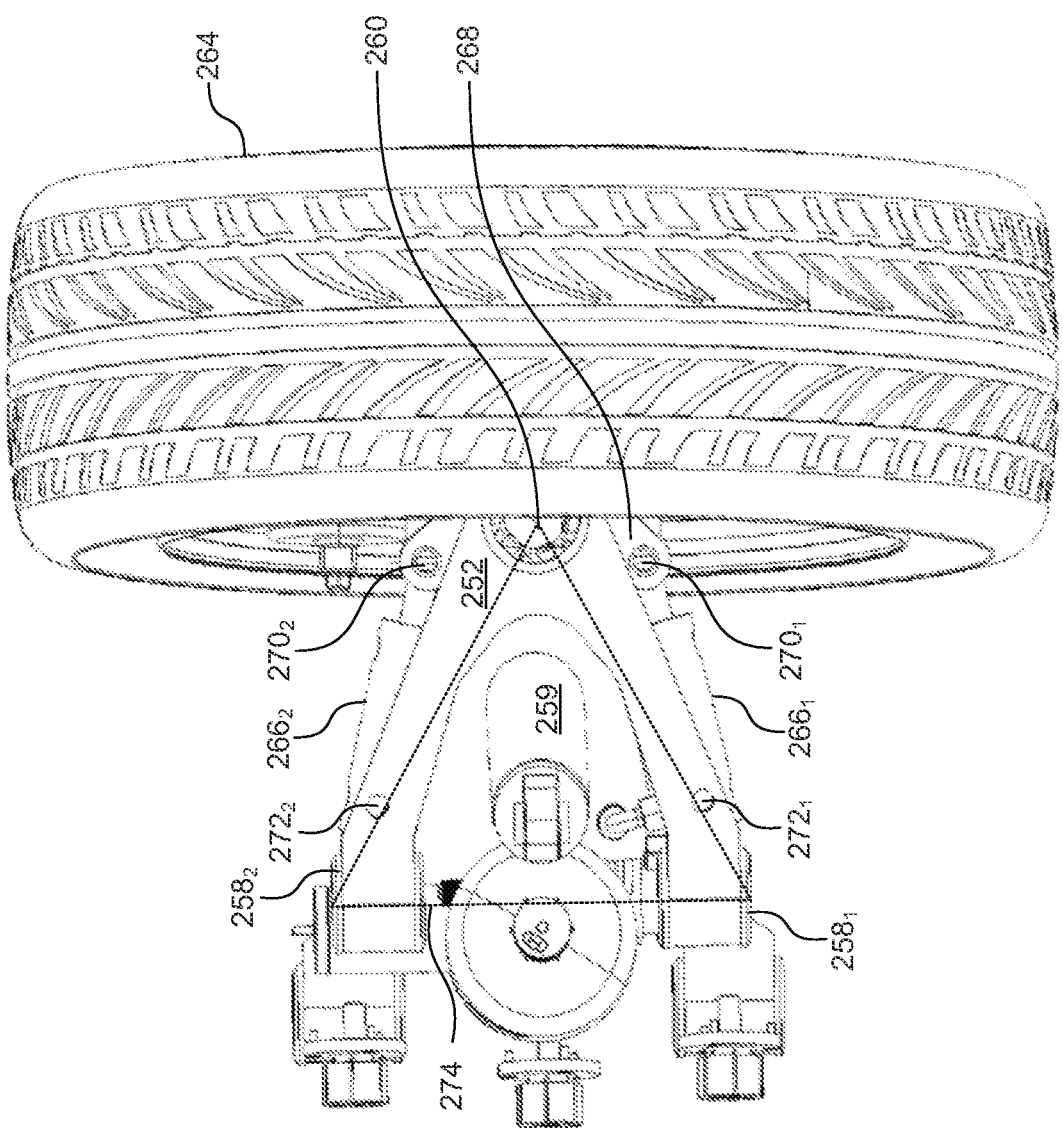

Reference is now made to FIGS. 4A and 4B, which are schematic illustrations of an exemplary implementation of a suspension and steering mechanism, generally referenced 250, constructed and operative in accordance with another embodiment of the disclosed technique. FIG. 4A is an isometric view of the suspension and steering mechanism 250 and FIG. 4B is a top view of the suspension and steering mechanism 250. Suspension and steering mechanism 250 includes two suspension arms, first suspension arm 252 and second suspension arm 254, two steering actuators, steering actuator 2661 and steering actuator 2662. Suspension and steering mechanism 250 further includes a suspended wheel mount 262, a spring-damper assembly 259, a suspended wheel mount 262 and a steering arm 268. Each one of first suspension arms 252 and second suspension arm 254 includes a wheel mounting end and a base end. The wheel mounting end of each of first suspension arms 252 and second suspension arm 254 includes a steering axis 260. Steering arm 268 includes two arms extending from a rotation point (e.g., L shaped steering, V shaped steering, and arcuated steering arm, a straight double steering arm), where each arm includes an actuated end. Steering actuators 2661 and 2662 are, for example, a linear actuator (e.g., a hydraulic actuator, an electric linear actuator or a pneumatic linear actuator). Steering arm 268 and suspension arm 252 are connected, for example, is by a CV joint. In some embodiments, a CV (constant velocity) joint interconnects the vertex of steering arm 268 and the suspended wheel mount 262, thus transferring moment while allowing flexibility of movement between steering arm 268 and suspension arm 262.

The base end of first suspension arm 252 is rotatably coupled with a reference frame 256 via a joint 2581 and a joint 2582, such that first suspension arm 252 rotates about joints 2581 and 2582 around a base axis (not shown). The base end of second suspension arm 254 is rotatably coupled with a reference frame 256 via horizontal axis 2611 and horizontal axis 2612, such that second suspension arm 254 rotates about horizontal axes 2611 and 2612.

As seen in FIG. 4A, reference frame 256 is a sub-frame, adapted for connection to the vehicle platform (e.g. vehicle structural frame or a chassis). Suspended wheel mount 262 is coupled with the wheel mounting end of each one first suspension arms 252 and second suspension arms 254 via steering axis 260 such that suspended wheel mount 262 and each one first suspension arms 252 and second suspension arms 254 can rotate about each other about steering axis 260. Furthermore, in the example brought forth in FIGS. 4A and 4B, one end of spring damper assembly 259 is coupled with second suspension arm 254 and the other end of spring damper assembly 259 is operative to be coupled with the suspended object (e.g., a vehicle).

Steering arm 268 is coupled with first suspension arm 252 at steering axis 260 and at the rotation point of steering arm 268, such that steering arm 268 and first suspension arm 252 rotate one with respect to the other about steering axis 260, and each of the actuated ends extend toward opposite sides of the rotation point. Similar to as described above, suspended wheel mount 262, to which a wheel 264 is coupled, is coupled with steering arm 268, such that when steering arm 268 rotates about steering axis 260, suspended wheel mount 262 also rotates therewith.

A first actuated end of steering arm 268 is coupled with the actuating end of first steering actuator 2661 at axis 2701, such that steering actuator 2661 and steering arm 268 can rotate one with respect to the other about vertical axis 2721. The fixed end of first actuator arm 2661 is rotatably coupled with first suspension arm 252 at axis 2251 such that steering actuator 2661 and first suspension arm 252 can rotate one with respect to the other about axis vertical 2721.

A second actuated end of steering arm 268 is coupled with actuating end of first steering actuator 2662 at axis 2702, such that steering actuator 2662 and steering arm 268 can rotate one with respect to the other about axis 2702. Fixed end of second actuator arm 2662 is rotatably coupled with first suspension arm 252 at vertical axis 2722 such that steering actuator 2662 and first suspension arm 252 can rotate one with respect to the other about vertical axis 2722.

In the example brought forth in FIGS. 4A and 4B, and similar to as described above in conjunction with FIGS. 3A and 3B, actuating ends 2661 and 2662 are configured to move from a retracted position to an extended position. As the actuating end of first steering actuator 2661 retracts, and the actuating end of second steering actuator 2662 extends, steering arm 268 and thus suspended wheel mount 262 and wheel 264 rotate clockwise. As the actuating end of first steering actuator 2661 extends, and the actuating end of second steering actuator 2662 retracts, steering arm 268 and thus suspended wheel mount 262 and wheel 264 rotate counterclockwise. Further as depicted in FIGS. 4A and 4B, and similar to as described above in conjunction with FIGS. 3A and 3B, each one of the fixed ends of steering actuators 2661 and 2662 is located within at least one of a horizontal cross-section of first suspension arm 252 and a triangle 274 defined by the rotation point of steering arm 268 (steering axis 260) and the largest width between joint 2581 and joint 2582.

Employing two steering actuators, similar to as described in FIGS. 3A and 3B and FIGS. 4A and 4B, provides redundancy such that if one steering actuator malfunctions, steering can still be performed with the other steering actuator. Also, employing two steering actuators prevents steering lock in case one of the steering actuators reaches a lock position (e.g., in FIGS. 1A and 1B, when steering actuator 104 is aligned with steering arm 106).

A steering and suspension mechanism according to the disclosed technique may include steering actuator and a spring. The spring is employed to prevent the steering actuator to lock in a dead center position. The spring is coupled between the suspension arm and the steering arm. The spring extends toward an opposite direction from the rotation point of the steering arm (i.e., relative to the actuated end of the steering arm). Reference is now made to FIGS. 5A and 5B, which are schematic illustrations of an exemplary suspension and steering mechanism, generally referenced 300, constructed and operative in accordance with a further embodiment of the disclosed technique. Suspension and steering mechanism 300 includes at least one suspension arm 302, a steering actuator 304, a spring 305, and a steering arm 306. Suspension arm 302 includes a wheel mounting end and a base end. The wheel mounting end of suspension arm 302 includes a steering axis 312. Steering arm 306 is a double steering arm (e.g., L shaped double steering arm, V shaped double steering arm, arcuated double steering arm, a straight double steering arm) and includes two arms extending from a rotation point, where each arm includes an actuated end. The arms of steering arm 306 are not necessarily symmetric. Steering actuator 304 includes an actuating end 3101 and a fixed end 3081. First steering actuator 304 is, for example, a linear actuator (e.g., a hydraulic actuator, an electric linear actuator or a pneumatic linear actuator). Spring 305 includes two ends including a moving end 3102 and a fixed end 3082.

Steering arm 306 is coupled with suspension arm 302 at steering axis 312 and at the rotation point of steering arm 306 such that steering arm 306 and suspension arm 302 rotate one with respect to the other about steering axis 312 and each of the actuated ends extend toward opposite directions from steering axis 312. Similar to as described above, a suspended wheel mount (i.e., to which a wheel is coupled) is coupled with steering arm 306 at or near this rotation point such that when steering arm 306 rotate about steering axis 312, the suspended wheel mount also rotates therewith. The rotation point of steering arm 306 is connected with suspension arm 302, for example, by a CV joint. A CV joint may further connect the vertex of steering arm 306 and the suspended wheel mount. A first actuated end of steering arm 306 is coupled with actuating end 3101 of first steering actuator 3041 at axis 3141, such that first steering actuator 3041 and steering arm 306 can rotate one with respect to the other about axis 3141. Fixed end 3081 of first steering actuator 3041 is rotatably coupled with suspension arm 302 at vertical axis 3161 such that first steering actuator 3041 and suspension arm 302 can rotate one with respect to the other about vertical axis 3161.

Similarly, a second actuated end of steering arm 306 is coupled with moving end 3102 of spring 305 at axis 3142, such that second steering actuator 3042 and steering arm 306 can rotate one with respect to the other about axis 3142. Fixed end 3082 of spring 305 is rotatably coupled with suspension arm 302 at vertical axis 3162 such that second steering actuator 3042 and suspension arm 302 can rotate one with respect to the other about vertical axis 3162. The base end of suspension arm 302 is rotatably coupled with a reference frame via a joint 3091 and a joint 3092. Each of joints 3091 and 3092 rotates around a base axis (not shown) extending through joints 3091 and 3092 such that suspension arm 302 rotates about joints 3091 and 3092 (i.e., in and out of the page of FIGS. 5A and 5B).

In the example brought forth in FIGS. 5A and 5B, actuating end 3101 is configured to move from a retracted position to an extended position. As actuating end 3101 of steering actuator 304 retracts, steering arm 306 and thus the suspended wheel mount rotate counterclockwise and spring 305 is stretched. Spring 305 exerts a clockwise force on steering arm 306. Thus, if steering actuator 304 reaches a dead center lock position, spring 305 shall pull steering arm 306, and thus steering actuator 304, from this dead lock position.

As actuating end 3101 of steering actuator 304 extends, steering arm 306 and thus the suspended wheel mount rotate clockwise and spring 305 compresses. Also, as seen in FIGS. 5A and 5B, as actuating ends 3101 extends, the horizontal position actuating end 3101 move outside the horizontal cross-section of suspension arm 302. Conversely, as actuating end 3101 retracts, the horizontal position actuating end 3101 move inside the horizontal cross-section of suspension arm 302. Further as depicted in FIGS. 5A and 4B, and similar to as described above in conjunction with FIGS. 1A and 1B and FIGS. 2A and 2B, the horizontal position of one of the fixed ends 3081 and 3082 is located within at least one of a horizontal cross-section of suspension arm 302 and a triangle 318 defined by the rotation point of steering arm 306 (and steering axis 312) and the largest width between joint 3091 and joint 3092. Along the base axis, the largest width is defined as the width between the farthest points separating joints 3091 and 3092 which is the base of triangle 318 as shown in FIGS. 5A and 5B. In general, the horizontal position of a fixed end of at least one of steering actuator 304 of the spring 305 is located within at least one of a horizontal cross-section of suspension arm 302 and a triangle 318 defined by the steering axis and the largest width between axis or axes about which suspension arm 302 rotates. According to another embodiment, the horizontal position of a fixed end of at least one of steering actuator 304 and spring 305 is located within a geometry (e.g., a triangle, a square, a rectangle, polygon) defined by steering axis 312 and the axis or axes about which suspension arm 302 rotates. In description brought forth herein above in conjunction with FIGS. 1B, 2B, 3B and 5B, when the actuator is fully retracted, the horizontal position of the actuating end, as well as the fixed end of the steering actuator, are located within a geometry (e.g., a triangle, a square, a rectangle, polygon) defined by the steering axis and the axis or axes about which the suspension arm rotates. In FIGS. 5A and 5B, spring 305 is exemplified as a helical spring. However, spring 305 may also be a torsion spring coupled to steering arm 306 and having a rotation center about steering axis 312. According to another example arm of steering arm 306 which is not connected to steering actuator 304 includes a resilient portion, such as the resilient portion acts as a spring that applies a load on the steering arm. The resilient portion may be connected to the suspension arm, for example at fixed end 3082.

Positioning the horizontal location of a fixed end of at least one of the steering actuators as described above in conjunction with FIGS. 1A-1B, 2A-2B, 3A-3B, 4A-4B and 5A-5B reduces the volume of the suspension and steering mechanism according to the disclosed technique, (i.e., relative to prior art mechanisms). Also, positioning the horizontal location of a fixed end of at least one of the steering actuators as described above increases the range of the steering angle (e.g. on the order of 100 degrees) of the wheel without locking, since the motion action of the steering actuator increases. Also, in this configuration, the suspension arm provides protection to the steering actuators and bump steering is reduced. For example, in FIG. 4A, steering actuator 2661 is at least partially protected by steering arm 252. Also exemplified in FIG. 4A, steering actuator 2661 is aligned with steering arm 252, thus reducing bump steering.

As mentioned above, a steering actuator employed in the suspension and steering mechanism according to the disclosed technique may be a hydraulic actuator. When hydraulic actuators are employed for steering, and hydraulic brakes are employed in the vehicle, the hydraulic reservoir may be shared between, for example, the steering and brakes mechanism. Also, employing hydraulic steering actuators provides design flexibility with regards to the position of the various components of the steering system (i.e., hydraulic reservoir, hydraulic pump and steering actuators) since these components may be hydraulically coupled via pipes. For example, the hydraulic manifold, which is part of the hydraulic circuit of the steering and/or brake actuators, is located in the reference frame. Furthermore, the suspension arm to which the steering actuator is coupled may be with the one that absorbs the least shock energy. For example, the lower suspension arm absorbs most of the shock energy. As such, the steering actuators may be coupled with the upper suspension arm. The steering actuator may also be designed to eliminate self-lock when not actuated, and to enable the actuator when needed. Eliminating the self-lock may provide flexibility in the positioning of the steering actuator, and may act to absorb a portion of the shocks energy. The steering actuator is controlled, for example, with control loops to control the state of the actuator when not actuated, and for changing the steering angle when actuated. As a further example, when hydraulic actuators are employed, a relief valve can be employed to enable or disable the hydraulic actuators.

It should be noted that the suspension and steering mechanism disclosed elsewhere herein may be part of a wheel assembly or a wheel corner assembly having the suspension and steering mechanism assembled thereto. In some embodiments, for example as shown in FIG. 4A, the wheel assembly includes a sub-frame, and the suspension and steering mechanism is mechanically coupled to the sub-frame.

It will be appreciated by persons skilled in the art that the disclosed technique is not limited to what has been particularly shown and described hereinabove. Rather the scope of the disclosed technique is defined only by the claims, which follow.

The invention claimed is:

1. A suspension and steering mechanism for a vehicle comprising:
- at least one suspension arm comprising a wheel mounting end and a base end, said base end rotatably coupled with a reference frame via a first joint and a second joint along a base axis;
- a steering arm including a first actuated end and a second actuated end, said steering arm coupled with said at least one suspension arm at a rotation point of said steering arm, said first actuated end and second actuated end each extending toward a first direction and a second direction from said rotation point;
- a first steering actuator, including an actuating end and a fixed end, said steering actuator is rotatably coupled at said fixed end thereof with said at least one suspension arm, and rotatably coupled at said actuating end with one of said actuated first and second ends of said steering arm; and
- a second steering actuator, including an actuating end and a fixed end, said second steering actuator is rotatably coupled at said fixed end thereof with said at least one suspension arm, and rotatably coupled at said actuating end with the other one of said actuated first and second ends of said steering arm,
- wherein a horizontal location of each of said fixed ends is within at least one of a horizontal cross section of said at least one suspension arm, and a triangle defined by said rotation point and the largest width between said first joint and said second joint along said base axis.

2. The suspension and steering mechanism according to claim 1, wherein each one of said first steering actuator and said second steering actuator is operative to move between a retracted position and an extended position.

3. The suspension and steering mechanism according to claim 1, wherein said first steering actuator and said second steering actuators are hydraulic actuators actuated by a hydraulic system.

4. The suspension and steering mechanism according to claim 1, further comprising a constant velocity (CV) joint at said rotation point for coupling said steering arm with said at least one suspension arm.

5. The suspension and steering mechanism according to claim 1, further comprising a spring, coupled between said at least one suspension arm and said steering arm and extending toward said second direction from said rotation point.

6. A vehicle, comprising:
- a vehicle reference frame; and
- at least one suspension and steering mechanism according to claim 1, connected to said vehicle reference frame.

7. A suspension and steering mechanism for a vehicle comprising:
- at least one suspension arm comprising a wheel mounting end and a base end, said base end rotatably coupled with a reference frame via a first joint and a second joint along a base axis;
- a steering arm including an actuated end, said steering arm coupled with said at least one suspension arm at a rotation point of said steering arm, said actuated end extending toward a first direction from said rotation point; and
- a steering actuator, including an actuating end and a fixed end, said steering actuator rotatably coupled at said fixed end thereof with said at least one suspension arm, and rotatably coupled at said actuating end with said actuated end of said steering arm,
- wherein a horizontal location of said fixed end is within at least one of a horizontal cross-section of said at least one suspension arm, and a triangle defined by said rotation point and the largest width of between said first joint and said second joint along said base axis;

wherein said steering actuator is operative to move between a retracted position and an extended position; and wherein when said steering actuator is in said retracted position, a horizontal position of said actuating end is located inside said horizontal cross section of said at least one suspension arm.

8. The suspension and steering mechanism according to claim 7, wherein said steering actuator is a hydraulic actuator actuated by a hydraulic system.

9. The suspension and steering mechanism according to claim 7, further comprising a spring, coupled between said at least one suspension arm and said steering arm and extending toward a second direction from said rotation point.

10. The suspension and steering mechanism according to claim 7, further comprising a constant velocity (CV) joint at said rotation point for coupling said steering arm with said at least one suspension arm.

11. A vehicle, comprising:
a vehicle reference frame; and
at least one suspension and steering mechanism according to claim 7, connected to said vehicle reference frame.

12. A suspension and steering mechanism for a vehicle comprising:
at least one suspension arm comprising a wheel mounting end and a base end, said base end rotatably coupled with a reference frame via a first joint and a second joint along a base axis;
a steering arm including an actuated end, said steering arm coupled with said at least one suspension arm at a rotation point of said steering arm, said actuated end extending toward a first direction from said rotation point; and
a steering actuator, including an actuating end and a fixed end, said steering actuator rotatably coupled at said fixed end thereof with said at least one suspension arm, and rotatably coupled at said actuating end with said actuated end of said steering arm,
wherein a horizontal location of said fixed end is within at least one of a horizontal cross-section of said at least one suspension arm, and a triangle defined by said rotation point and the largest width between said first joint and said second joint along said base axis; and
wherein said steering arm is connected with said rotation point by a constant velocity (CV) joint.

13. The suspension and steering mechanism according to claim 12, wherein said steering actuator is operative to move between a retracted position and an extended position.

14. The suspension and steering mechanism according to claim 12, wherein said steering actuator is a hydraulic actuator actuated by a hydraulic system.

15. The suspension and steering mechanism according to claim 12, further comprising a spring, coupled between said at least one suspension arm and said steering arm and extending toward a second direction from said rotation point.

16. A vehicle, comprising:
a vehicle reference frame; and
at least one suspension and steering mechanism according to claim 12, connected to said vehicle reference frame.

17. A suspension and steering mechanism for a vehicle comprising:

at least one suspension arm comprising a wheel mounting end and a base end, said base end rotatably coupled with a reference frame via a first joint and a second joint along a base axis;
a steering arm including an actuated end, said steering arm coupled with said at least one suspension arm at a rotation point of said steering arm, said actuated end extending toward a first direction from said rotation point; and
a steering actuator, including an actuating end and a fixed end, said steering actuator rotatably coupled at said fixed end thereof with said at least one suspension arm, and rotatably coupled at said actuating end with said actuated end of said steering arm,
wherein a horizontal location of said fixed end is within at least one of a horizontal cross-section of said at least one suspension arm, and a triangle defined by said rotation point and the largest width between said first joint and said second joint along said base axis;
wherein said steering actuator is a hydraulic actuator actuated by a hydraulic system having a hydraulic reservoir, a hydraulic pump and a hydraulic manifold, coupled therebetween and with said steering actuator; and
at least one of the following applies:
(i) said hydraulic reservoir is shared with a brake system of said vehicle;
(ii) said hydraulic reservoir, said hydraulic pump and said hydraulic manifold are located in said reference frame; and
(iii) said steering actuator comprises a relief valve to at least one of enable and disable an operation of said steering actuator.

18. The suspension and steering mechanism according to claim 17, further comprising a constant velocity (CV) joint at said rotation point for coupling said steering arm with said at least one suspension arm.

19. A vehicle, comprising:
a vehicle reference frame; and
at least one suspension and steering mechanism according to claim 17, connected to said vehicle reference frame.

20. A suspension and steering mechanism for a vehicle comprising:
at least one suspension arm comprising a wheel mounting end and a base end, said base end rotatably coupled with a reference frame via a first joint and a second joint along a base axis;
a steering arm including an actuated end, said steering arm coupled with said at least one suspension arm at a rotation point of said steering arm, said actuated end extending toward a first direction from said rotation point; and
a steering actuator, including an actuating end and a fixed end, said steering actuator rotatably coupled at said fixed end thereof with said at least one suspension arm, and rotatably coupled at said actuating end with said actuated end of said steering arm,
wherein a horizontal location of said fixed end is within at least one of a horizontal cross-section of said at least one suspension arm, and a triangle defined by said rotation point and the largest width between said first joint and said second joint along said base axis; and
wherein said at least one suspension arm comprises at least two suspension arms, and wherein said steering actuator is coupled with the one of said at least two suspension arms that absorbs the least shock energy.

21. The suspension and steering mechanism according to claim 20, wherein said steering actuator is operative to move between a retracted position and an extended position.

22. The suspension and steering mechanism according to claim 20, wherein said steering actuator is a hydraulic actuator actuated by a hydraulic system.

23. The suspension and steering mechanism according to claim 20, further comprising a spring, coupled between said at least one suspension arm and said steering arm and extending toward a second direction from said rotation point.

24. The suspension and steering mechanism according to claim 20, further comprising a constant velocity (CV) joint at said rotation point for coupling said steering arm with said at least one suspension arm.

25. A vehicle, comprising:
a vehicle reference frame; and
at least one suspension and steering mechanism according to claim 20, connected to said vehicle reference frame.

26. A suspension and steering mechanism comprising:
at least one suspension arm comprising a wheel mounting end and a base end, said base end rotatably coupled with a reference frame via a first joint and a second joint along a base axis;
a steering arm including an actuated end, said steering arm coupled with said at least one suspension arm at a rotation point of said steering arm; and
a steering actuator, comprising an actuating end and a fixed end, said fixed end rotatably coupled with said at least one suspension arm, said actuating end rotatably coupled with said actuated end of said steering arm, said actuating end is configured to move between an extended position and a retracted position,
wherein when said actuating end is in said retracted position, a horizontal position of said actuating end is inside a horizontal cross section of said at least one suspension arm.

27. A vehicle, comprising:
a vehicle reference frame; and
at least one suspension and steering mechanism according to claim 26, connected to said vehicle reference frame.

28. The suspension and steering mechanism according to claim 26, wherein said steering actuator is a hydraulic actuator actuated by a hydraulic system.

29. The suspension and steering mechanism according to claim 26, further comprising a spring, coupled between said at least one suspension arm and said steering arm and extending toward a second direction from said rotation point.

30. The suspension and steering mechanism according to claim 26, further comprising a constant velocity (CV) joint at said rotation point for coupling said steering arm with said at least one suspension arm.

* * * * *